United States Patent Office 2,735,862
Patented Feb. 21, 1956

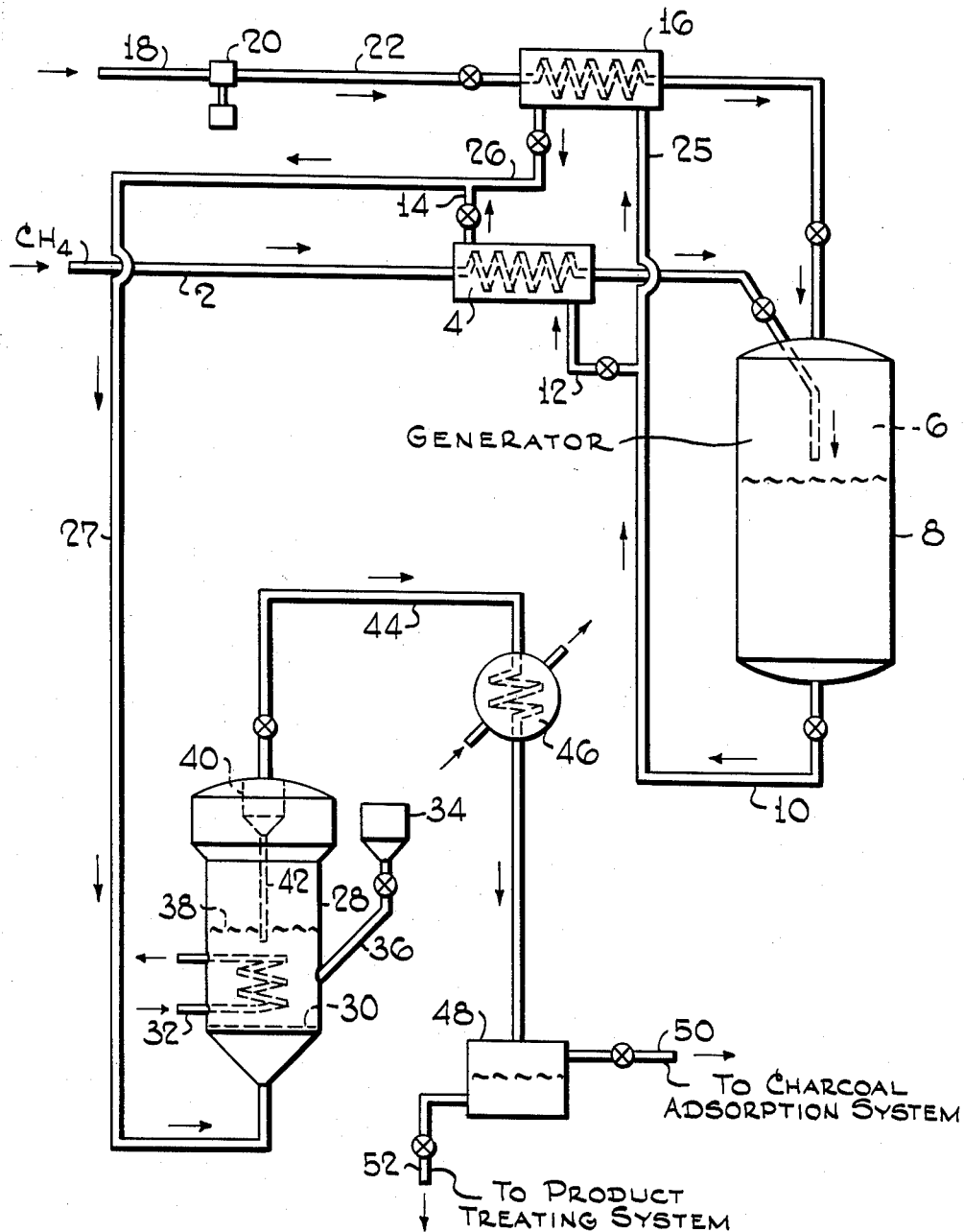

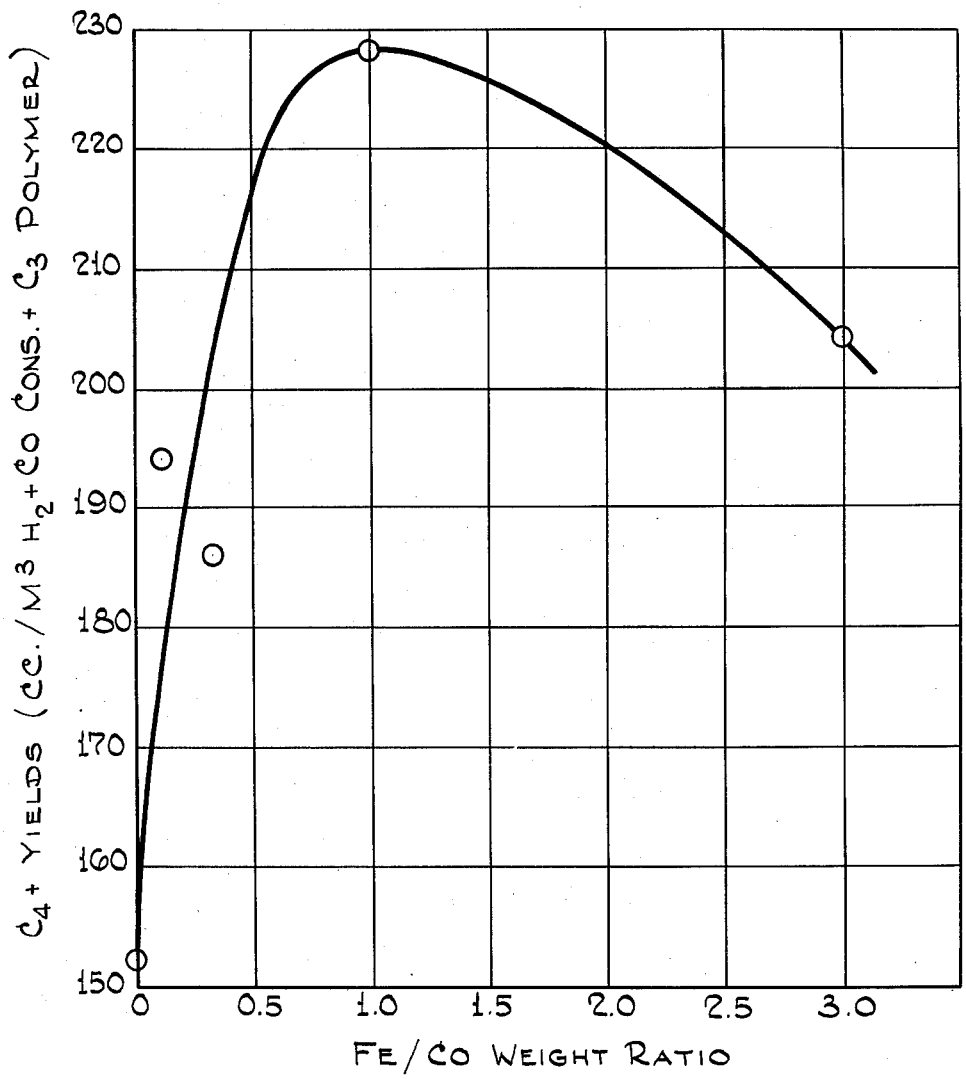

2,735,862

SYNTHESIS OF HYDROCARBONS WITH IRON-COBALT CATALYST

Fred J. Buchmann and William J. Mattox, Baton Rouge, La., assignors to Esso Research and Engineering Company, a corporation of Delaware Application May 8, 1951, Serial No. 225,095

6 Claims. (Cl. 260—449.6)

The present invention is a continuation-in-part of copending application Serial No. 96,598, filed June 1, 1949, now abandoned, and relates to the catalytic reaction between carbon monoxide and hydrogen to form valuable liquid hydrocarbons. More particularly, the present invention is concerned with improvements in the reaction based on an improved composition of catalyst employed in the reaction.

The synthetic production of liquid hydrocarbons from gas mixtures containing various proportions of carbon monoxide and hydrogen is a matter of record, and numerous catalysts, usually containing an iron group metal, have been described which are specifically active in promoting the desired reactions at certain preferred operating conditions. For example, cobalt supported on an inert carrier is used when relatively low pressures of about 1 to 5 atmospheres and low temperatures of about 300° to about 425° F. are applied in the manufacture of a substantially saturated hydrocarbon product, while at higher temperatures of 450°–750° F. and higher pressures of 15–40 atmospheres required for the production of unsaturated and branch chained products of high antiknock value, iron type catalysts are more suitable.

In both cases, the reaction is strongly exothermic and the utility of the catalyst declines steadily in the course of the reaction chiefly due to deposition of non-volatile conversion products such as paraffin wax, carbon, and the like on the catalyst.

The extremely exothermic character and high temperature sensitivity of the synthesis reaction and the relatively rapid catalyst deactivation have led, in recent years, to the application of the fluid solids technique wherein the synthesis gas is contacted with a turbulent bed of finely divided catalyst fluidized by the gaseous reactants and products. This technique permits continuous catalyst replacement and greatly improves heat dissipation and temperature control.

In order for the hydrocarbon synthesis process to be competitive with other processes for making synthetic gasoline or with petroleum derived gasoline, costs must be kept at as low a level as possible. Most processes for hydrocarbon synthesis involve the production of relatively pure oxygen for the partial combustion of natural gas, if the latter is a source of synthesis gas, or for supplying the heat by combustion to the water gas process if that is the source of synthesis gas. In order to produce a highly unsaturated hydrocarbon product of high octane value, it is customary to operate the synthesis reaction at pressures of about 400 pounds in the presence of an iron catalyst, since the art has shown that an iron catalyst at elevated pressure is in general, more siutable for producing high octane gasoline than a cobalt catalyst, which may be operated at lower pressures. It has generally been found that a cobalt catalyst is specific to formation of long chain normal hydrocarbons which require reforming, cracking, or dehydrogenation before they are suitable for use as gasoline. The high pressure operations employed in iron hydrocarbon synthesis employing tail gas recycle involve also, production of relatively pure oxygen, also at high pressures. It would be uneconomic to employ air at high pressures rather than oxygen for producing synthesis gas, because the recycle requirements associated with an iron catalyst would result in the undesirable recirculation of a gas containing an ever increasing amount of nitrogen.

As indicated above, it would be highly desirable to operate a hydrocarbon synthesis process by the fluid solids technique employing a synthesis gas prepared at low pressures, by air instead of by oxygen at high pressures and wherein the synthesis operation itself is carried out at moderate instead of high pressures and wherein valuable olefinic motor fuel is obtained. However, what is required to make a system operable at low pressure for making high quality gasoline when air is employed in the production of the synthesis gas, and hence large quantities of nitrogen are present in the synthesis reactor, is a once-through operation wherein recycle of tail gas is completely dispensed with or greatly minimized. The catalyst required to make such a system operable must have several characteristics and must fulfill the following requirements:

1. It must have a good activity in order to utilize the synthesis gases efficiently. It must convert a reasonable amount of them since a once-through process alone is employed.

2. The catalyst must have associated with it, a high consumption ratio, that is, the ratio of hydrogen to CO which is converted in the reaction zone, must be essentially the same as that fed.

Thus, when operating with a synthetic gas prepared by air oxidation, the gas contains a large percentage of nitrogen. Due to this fact it is, of course, undesirable to recycle tail gas, which contains $CO_2$, in order to obtain overall high CO and $H_2$ conversions. In normal operation, this tail gas, containing large amounts of $CO_2$, is recycled, but when nitrogen is present, as when the synthetic gas is prepared by air oxidation, this recycle is undesirable and thus, of course, it is highly desirable to operate the synthesis in a once-through operation and obtain maximum conversion of the feed. It is also desirable to operate at lowest pressures possible because of the greater economies involved. In a once-through operation at a pressure of 50 to 100 pounds for instance, it is thus desirable that the $H_2$ to CO consumption ratio approach the ratio in which these constituents are present in the feed.

When employing a cobalt synthesis catalyst, the ratio of $H_2$ to CO consumed is generally greater than the $H_2$ to CO ratio in the feed up to ratios of about 2:1. On the other hand, all previously known modifications of iron synthesis catalyst such as for instance, pyrites ash or red iron oxide, ammonia synthesis catalyst, etc., gave $H_2$ to CO consumption ratios less than the ratio of these constituents in the feed.

In other words, the removal of oxygen in the synthesis reaction when cobalt is the catalyst appears to be accomplished by its elimination as water, and the reaction is accompanied by an $H_2/CO$ composition ratio of about 2/1. However, the olefinicity of the product is low and wax formation high. On the other hand, when an iron hydrocarbon synthesis catalyst is employed, oxygen is eliminated mainly as $CO_2$, which latter must be recycled to the reactor in order to maintain high overall conversion of $H_2$ and CO. Because of the water gas shift reaction, the overall $H_2/CO$ consumption ratio is substantially less than the $H_2/CO$ ratio in the feed.

It is the principal object of the present invention to provide a hydrocarbon synthesis process utilizing an improved type of catalyst operable at moderate pressures wherein high yields of valuable liquid synthesis products having a high degree of unsaturation are obtained substantially unaccompanied by wax formation.

It is also an object of the present invention to provide a combination process wherein air at low pressures rather than oxygen at elevated pressures may be employed in the preparation of hydrocarbon synthesis gas which in turn is converted at relatively low pressures into liquid hydrocarbons of high antiknock properties, wax formation being minimized therein.

Other objects of the invention will in part be obvious and will in part appear hereinafter.

It has now been found in accordance with the present invention that the foregoing objects and advantages may be achieved by carrying out the hydrocarbon synthesis by utilizing in the synthesis a special supported cobalt catalyst wherein part of the cobalt has been replaced by iron. Not only are there thus obtained excellent yields of olefinic products, but also wax formation is substantially minimized. Furthermore, it is found that the operating range wherein these beneficial effects are realized is a relatively narrow one, and relatively small variations in reaction conditions decrease either the yield or the olefinicity, or increase wax formation. Thus, by operating with the catalyst to be described more fully below, it has now become possible to operate a fluid solids reactor and obtain good yields of olefinic hydrocarbons without serious wax formation from synthetic gas prepared by a process involving oxidation by air instead of by oxygen, and at moderately low pressures.

As has been pointed out, when operating with synthesis gas prepared by air oxidation, the gas contains a large percentage of nitrogen. Due to this fact, it is undesirable to recycle tail gas, which contains $CO_2$, in order to obtain overall high CO and $H_2$ conversion. Hence, it is highly desirable to operate the synthesis in a once-through operation and obtain maximum conversion of the feed. In a once-through operation at a pressure of 50–100 p. s. i. g. with a fluidized catalyst it is thus desirable that the $H_2/CO$ consumption ratio approach the ratio in which these two constituents are present in the feed, particularly with a 2/1 $H_2/CO$ feed, although when lower feed ratios are used the consumption ratio may be somewhat higher than the feed ratio.

When employing a cobalt synthesis catalyst, the ratio of $H_2$ to CO consumed is greater than the $H_2$ to CO ratio in the feed, up to ratios of about 2/1. On the other hand, all previously known modifications of iron synthesis catalysts give $H_2$ to CO consumption ratios less than the ratio of these constituents in the feed. Now, however, the surprising discovery has been made that a catalyst of the composition detailed below and which contains both iron and cobalt gives $H_2/CO$ consumption ratios greater than the ratio of these constituents in the feed, thus making the process suitable for a once-through operation with synthesis gas from partial oxidation of natural gas, wherein the $H_2/CO$ ratio is about 2/1.

The catalyst of the present invention consists essentially of cobalt and iron promoted by thoria and supported on a siliceous carrier, preferably silica gel. However, as will be made more clear hereinafter, it has been found that catalysts having only certain restricted ratios of iron to cobalt in the composition have the properties and perform the functions enumerated above. Only when these two elements are present in rather critical proportions is the catalyst effective in a once-through operation and produces high yields of $C_4+$ hydrocarbons suitable for motor fuel, and this only when associated with the carrier and the thorium-dioxide promoter. The ratio of iron to cobalt must be kept within the limits of about 0.6/1 to about 2/1. Larger or smaller ratios of these components when present in the catalyst, is accompanied by marked falling off of gasoline product. Within this range the catalyst, though high in iron, surprisingly does not promote the water gas shift reaction.

The invention will best be understood by referring to the accompanying diagrammatic representation of one of the modifications of the present invention, where suitable equipment and flow of material are shown for carrying out one embodiment of the invention.

Referring now in detail to the drawings, natural gas from any convenient source preheated in preheater 4 is passed to synthesis gas producer vessel 6, which comprises a catalytic oxidation zone. Simultaneously, air is passed through line 18 into compressor 20, wherein it is moderately compressed to about 50–100 p. s. i. g. and the compressed material is passed through line 22 and preheater 16, wherein it is preheated to about 1200° F., and introduced into synthesis generator plant 6. In generator 6 partial oxidation mainly to CO and $H_2$ takes place. The temperature in the oxidation zone may be of the order of 2000–2500° F. The lower portion 8 of generator 6 may comprise a catalytic reformer bed, containing a reforming catalyst such as nickel or copper on magnesia, and any $CO_2$ and $H_2O$ formed as a result of combustion in the upper part of the generator will reform unreacted methane to produce further quantities of $H_2$ and CO.

The hot synthesis gases leaving generator 6, which are at a temperature of about 1600°–1800° F. are passed through line 10 and are preferably employed to preheat the incoming natural gas and air in preheaters 4 and 16, respectively, the synthesis gas stream being divided for this purpose to pass through lines 12 and 14, and through lines 25 and 26. The reunited synthesis gas stream in line 27, which has been cooled as indicated to about 450°–600° F., and may be further cooled if desired, is passed to the bottom of hydrocarbon synthesis reactor 28. The latter is preferably in the form of a vertical cylinder with a conical base and an upper expanded section, and has a grid (or screen) 30 located in the lower section to effect good gas distribution.

Within reactor 28, a mass of the catalyst described is maintained in the form of a finely divided powder having a particle size distribution from about 100–400 mesh, preferably about 150 to 200 mesh. This catalyst is supported on silica gel. Thus, for illustrative purposes, catalyst supplied to reactor 28 from catalyst hopper 34 through line 36 may have an iron + cobalt content of about 5 to 35%, thoria equivalent to 1 to 5% thorium, and silica of from 60 to 89%, the ratio of Fe to Co being in the range of 0.6/1 to 2/1.

The synthesis gas mixture, having a molar ratio of $H_2/CO$ of about 2 to 1, flows upwardly through grid 30. The superficial linear velocity of the gas within the reactor is kept within the approximate range of 0.1–3 feet per second, preferably about 0.4–1.5 feet per second so as to maintain the catalyst in the form of a dense, highly turbulent fluidized mass having a well defined upper level 38 and an apparent density of from about 30 to 125 lbs. per cubic foot, depending upon the fluidization conditions.

In accordance with the invention, the pressure within reactor 28 is kept within the approximate limits of 50 to 100 p. s. i. g, preferably about 55–75 p. s. i. g. and the temperature is maintained constant within the limits of about 475° to 525° F. Surplus heat from the exothermic reaction may be withdrawn by any conventional means, such as external cooling coil 32.

Only a small portion of the powdered catalyst is carried into the disengaging section of the reactor above level 38, and these catalyst particles are separated from the reaction products in a conventional gas-solids separator, such as cyclone 40 and returned to the dense bed via dip pipe 42. The rate of gas throughput in terms of volume of gas ($H_2+CO$) per weight of catalyst per hour, or v./hr./w., is in the range of 2 to 20, and is so adjusted as to give the desired conversion without need for any recycle of tail gas.

Product vapor and gases are withdrawn overhead from reactor 28 and are passed through line 44 and condenser 46 to liquid products separator 48, wherein liquid products are separated from gases. The liquid products, containing high yields of olefins with little or no oxygenated hydrocarbons may be withdrawn through line 52 for further processing, such as fractionation, cracking of the gas oil fraction, isomerization, polymerization, hydroforming, etc., all in a manner known per se.

The uncondensed gases, comprising lower molecular weight hydrocarbons as well as unreacted synthesis gas and nitrogen are preferably passed through line 50 to a fluidized solids, active carbon adsorption plant, wherein light hydrocarbons may be removed, and recovered by desorption, at the lower pressures of the present operation. This represents a considerably more economical process than the conventional oil absorption of tail gas.

The present invention admits of numerous modifications apparent to those skilled in the art. Thus, instead of producing synthesis gas from partial combustion of natural gas or methane by air at low pressures, synthesis gas may also be prepared by the water gas reaction from coal. In such case, depending on how heat is furnished to the process, either by direct combustion of coke or coal within the water gas generator with air or by recycling of hot combustion solids from a burner vessel, the synthesis gas may or may not contain appreciable quantities of nitrogen. However, the ratio of $H_2/CO$ in synthesis gas prepared from coal is about 1/1, and such a synthesis gas may be passed through a shift converter to increase the feed gas ratio from about 1/1 to about 2/1. In such a system, also, a desulfurizing step would be introduced, such as the passing of the synthesis gases through spent synthesis catalyst to remove sulfur.

The invention may be further illustrated by the following specific examples, which represent fixed bed laboratory data obtained in using the catalyst of the present invention.

Example I

Cobalt-iron catalyst may be prepared in the following manner: Fourteen wt. percent cobalt, 14 wt. percent iron and 4.4 wt. thorium (all as their hydrated nitrate salts) were mulled in a Simpson mixer with 67.6% silica (as silica hydrogel containing about 18% solids) and the wet mixture was then passed through a colloid mill. The above composite was dried at about 250° F. and then further heated for 48 hours at 420° F. and for an additional 5 to 6 hours at 550° F. to complete the decomposition of the nitrates. The resulting dried material was then ground to a suitable size and reduced with hydrogen at 700° F. and atmospheric pressure.

Example II

The following example delineates clearly the critical effects of variations of the cobalt-iron ratio upon the reaction, yields, and product olefinicity.

| Catalyst: | | | | | |
|---|---|---|---|---|---|
| Percent Cobalt in Catalyst | 28.0 | 25.2 | 21.0 | 14.0 | 7.0 |
| Percent Iron in Catalyst | 0 | 2.8 | 7.0 | 14.0 | 21.0 |
| Fe/Co Weight Ratio | 0.0 | 0.11 | .33 | 1.0 | 3.0 |
| Pressure, P. s. i. g | 75 | 75 | 75 | 75 | 75 |
| Temperature, ° F | 500 | 500 | 500 | 500 | 500 |
| Feed, $H_2/CO$ Ratio | 1.15 | 1.15 | 1.15 | 1.15 | 1.15 |
| Feed Rate, V./V./Hr | 320 | 320 | 320 | 320 | 320 |
| CO Conversion | 96 | 64 | 59 | 45 | 41 |
| $H_2$ Conversion | 96 | 95 | 92 | 73 | 72 |
| $H_2/CO$ Cons. Ratio | 1.14 | 1.72 | 1.79 | 1.89 | 1.89 |
| $C_4+$, cc./m.³ $H_2+CO$ Consumed+$C_3$ Polymer | 152 | 194 | 186 | 228 | 204 |
| Olefins in Exit Gas: | | | | | |
| Percent In $C_2$ | 2 | 13 | 7 | 6 | 9 |
| Percent In $C_3$ | 31 | 68 | 51 | 46 | 57 |
| Percent In $C_4$ | 56 | 75 | 72 | 82 | |
| Weathered Product: | | | | | |
| Init.-400° F., Vol. Percent | | 71 | 82 | 76 | 77 |
| Unsat. of Init.-430° F., Percent | 45 | 66 | 64 | 64 | 58 |
| $C_4$ Product: | | | | | |
| Unsat., Percent | | 76 | 76 | 73 | |
| Butene-2/Butene-1 | | 3.2 | 4.0 | 4.0 | |
| Water Gas Constant, Percent of Equilibrium | (¹) | (¹) | (¹) | (¹) | (¹) |

¹ Less than 0.1%.

The above data which are also shown graphically in Fig. II, clearly indicate the following:

1. The cobalt-iron catalysts of the invention give high $H_2/CO$ consumption ratios despite a low $H_2/CO$ ratio gas. This is consistent with the fact that the calculated water gas constant is less than 0.1% of the equilibrium value, although the amount of iron present is relatively high. In the case of a promoted iron catalyst under similar reaction conditions, the approach to equilibrium is in the neighborhood of 50 to 90%.

2. When the ratio of iron to cobalt is less than about 0.6/1, the yield of gasoline product ($C_4+$) drops rapidly, and the consumption ratio also decreases. A similar drop in gasoline production is apparent when the iron to cobalt ratio is above 2.

3. The butene-2/butene-1 ratio is high, which is in marked contrast to the low ratios obtained with iron catalysts. This means that since alpha olefins are low, further treating of the product for octane improvement, such as by isomerization, is simplified. This is also true in respect to treatment to convert oxygenated hydrocarbons to olefins; such compounds are found only in negligible quantities in the product from the iron-cobalt catalyst as against an iron catalyst, in the product from which they may be present in amounts equivalent to 2–4% oxygen.

Thus, in accordance with the invention, hydrocarbon synthesis operations may be carried out at low pressures in the presence of a cobalt-iron catalyst wherein these ingredients are present in critical ratios, to give high yields of unsaturates and minimum quantities of wax. By dispensing with an oxygen unit and operating a synthesis gas generator with air, investment costs are substantially decreased from the level where a high pressure type of operation requiring an oxygen unit is employed.

While the foregoing description and exemplary operations have served to illustrate a specific application and results of the invention, other modifications obvious to those skilled in the art are within its scope.

What is claimed is:

1. An improved process for converting CO and $H_2$ to normally liquid hydrocarbons of high olefinic content which comprises contacting in a once-through operation CO and $H_2$ in synthesis proportions in a reaction zone at synthesis conditions with a dense turbulent fluidized mass of finely divided synthesis catalyst, said catalyst comprising a silica gel support carrying as active component a mixture of cobalt and iron promoted with a minor amount of thoria, the wt. ratio of iron to cobalt being in the range of from about 0.6/1 to 2/1 and the thoria being present in the range of about 1 to 5% of the total weight of the catalyst, and recovering from said zone a product stream including a tail gas essentially free of carbon dioxide and a normally liquid product containing at least about 60 volume % of unsaturated hydrocarbons.

2. The process of claim 1 wherein said catalyst consists of about 14.0% cobalt, 14.0% iron, 4.4% thoria and 67.6% silica by weight.

3. The process of claim 1 wherein said synthesis conditions include pressures in the range of about 50 to 100 p. s. i. g. and temperatures in the range of about 475° to 525° F.

4. An improved low pressure once-through process for preparing high yields of valuable olefinic hydrocarbons from synthesis gas containing appreciable quantities of nitrogen which comprises passing CO and $H_2$ in synthesis proportions diluted with nitrogen into a hydrocarbon synthesis reaction zone, contacting said gaseous mixture with a dense turbulent mass of finely divided synthesis catalyst consisting of a silica gel support, said support carrying as active components, a mixture of iron and cobalt promoted with about 1 to 5% of thoria, the wt. ratio of said iron to said cobalt being in the range of from about 0.6/1 to about 2/1, maintaining a pressure of about 50 to 100 p. s. i. g. and a temperature of about 475° to 525° F. within said zone and withdrawing a product containing high yields of liquid olefinic hydrocarbon product and a tail gas substantially free of carbon dioxide.

5. The process of claim 4 wherein said catalyst consists of 14.0% cobalt, 14.0% iron, 4.4% thoria and 67.6% $SiO_2$ by weight.

6. The process of claim 4 wherein said pressure is about 75 p.s.i.g. and said temperature about 500° F.

References Cited in the file of this patent

UNITED STATES PATENTS

| | | |
|---|---|---|
| 2,274,639 | Scheuermann et al. | Mar. 3, 1942 |
| 2,406,864 | Thomas | Sept. 3, 1946 |
| 2,488,128 | Kimberlin, Jr., et al. | Nov. 15, 1949 |
| 2,512,608 | Buchmann | June 27, 1950 |
| 2,550,442 | Beck et al. | Apr. 24, 1951 |
| 2,662,090 | Scharmann | Dec. 8, 1953 |